US007987020B1

(12) United States Patent
Swinea, Jr.

(10) Patent No.: US 7,987,020 B1
(45) Date of Patent: Jul. 26, 2011

(54) KEY STORAGE AND DISPENSING ASSEMBLY AND A METHOD FOR STORING AND DISPENSING KEYS

(76) Inventor: Jessie Donald Swinea, Jr., Royal Oak, MI (US)

( * ) Notice: Subject to any disclaimer, the term of this patent is extended or adjusted under 35 U.S.C. 154(b) by 1175 days.

(21) Appl. No.: 11/698,589

(22) Filed: Jan. 27, 2007

Related U.S. Application Data

(60) Provisional application No. 60/763,025, filed on Jan. 27, 2006.

(51) Int. Cl.
*G06F 17/00* (2006.01)

(52) U.S. Cl. ........ 700/243; 700/236; 700/240; 700/242; 700/244

(58) Field of Classification Search ........................ None
See application file for complete search history.

(56) References Cited

U.S. PATENT DOCUMENTS 5,038,023 A * 8/1991 Saliga .......................... 235/385
5,212,649 A * 5/1993 Pelletier et al. ............... 700/243
6,707,380 B2 * 3/2004 Maloney .................... 340/568.1
6,880,754 B1 * 4/2005 Lie-Nielsen et al. ......... 235/385

* cited by examiner

*Primary Examiner* — Timothy R Waggoner
(74) *Attorney, Agent, or Firm* — John G. Chupa

(57) ABSTRACT

A key storage and dispensation assembly 10 which selectively and securely stores keys, such as key 144 and which allows access to a stored key, such as key 144, without allowing access to the remaining key, and to a method which uses such a technique.

2 Claims, 12 Drawing Sheets

KEY STORAGE AND DISPENSING ASSEMBLY AND A METHOD FOR STORING AND DISPENSING KEYS

This application claims the benefit of U.S. Provisional Application No. 60/763,025 filing date Jan. 27, 2006.

GENERAL BACKGROUND

1. Field of the Invention

The present invention generally relates to a key storage and dispensing assembly and to a method which allows keys to be securely stored and selectively dispensed and more particularly, to an assembly which securely stores a plurality of keys and which allows access to only a pre-selected one of the plurality of stored keys.

2. Background

It is desirable to selectively and securely store and dispense keys. For example, a typical automobile dealership utilizes many keys, each of which are adapted to respectively allow a unique one of the many parked automobiles to be ridden for a "test ride". Due to the relatively large number of such keys and the relatively large value associated with the automobile assets that these keys control, it is very important that the keys be tightly monitored and the use of these keys supervised (e.g., if the keys were readily available to the public, many unauthorized and perhaps unidentified or not properly identified users could take control of the automobiles and steal them).

Automobile dealerships have tried to address this issue in several ways, such as by allowing only one or a very few people to control the distribution of these keys. While this approach does centralize responsibility, due to the large number of keys and due to the typical large demand for such keys, such centralized control strategies require the service of a relatively large number of individuals (e.g., employees) making this strategy relatively costly. Further, the required relatively large number of individuals concomitantly increases the amount of recordkeeping (e.g., usually accomplished in some sort of respectively unique manual style), thereby representing a relative complex and typically unmanageable task and making it difficult to actually "track" the use of these keys.

To overcome these drawbacks, one approach which has been used involves the use of a central depository (e.g. a safe or some other type of depository) which is secured (e.g., by lock and key or by a computer type assembly) and which includes some sort of "sign out sheet", thereby presumably causing a record to be created of the key activity. While this approach does alleviate some of the afore-described disadvantages of prior activities (e.g., this approach may be used with relatively low cost), it too has some serious drawbacks.

By way of example and without limitation, once opened, the central depository allows access to all of the stored keys, thereby allowing all of the assets that those stored keys represents to be made available to whoever has access to the depository. Further, no independent verification is made of the identity of the person who actually accesses the depository (e.g., such as requiring the person to have a certain coded card or to record the biometric data of the person) and no independent record is made of the number and identity of the keys that the person takes, thereby making the system vulnerable to fraud and dishonest behavior. The term "independent", in this context, means information obtained from a source other than that given by the person accessing the deposit of keys.

There is therefore a need for a new and improved key storage and dispensing system which overcomes some or all of the previously delineated disadvantages of prior and current systems, including but not limited to those which are set forth above. The current system provides these and other benefits in a new and novel manner.

SUMMARY OF THE INVENTION

It is a first non-limiting object of the present invention to provide a system for storing and selectively dispensing keys in a manner which overcomes some or all of the previously delineated drawbacks associated with prior and current systems.

It is a second non-limiting object of the present invention to provide a method for selectively storing and dispensing keys in a manner which overcomes the drawbacks of prior and current key storage and dispensation methodologies, including but not limited to those discussed above.

It is a third non-limiting object of the present invention to provide a key storage and dispensing assembly and a methodology which allows keys to be efficiently stored and which allows only a single one of the stored keys to be accessed at any one time.

According to a first non-limiting aspect of the present invention, a key storage and dispensing assembly is provided and includes a housing having an opening; a key reception assembly including a plurality of movable key reception slots which are movably disposed within the housing; and a controller which is coupled to the key reception assembly and which selectively moves the key reception assembly only to allow a predetermined single one of the plurality of movable key reception slots to communicate with the opening thereby allowing the single one of the plurality of key reception slots to selectively receive a key and allowing a key which may be resident within the single one of the plurality of key reception slots to be retrieved while preventing other of the plurality of the key reception slots from being accessed.

According to a second non-limiting aspect of the present invention, an assembly for storing and selectively dispensing keys is provided. Particularly, the assembly includes a housing having an opening and a door which is selectively movable from a first closed position in which the door overlays the opening, to a second open position in which its door is remote from the opening; a first wheel which is moveably disposed within the housing and which includes at least one first slot; a second wheel which is moveably disposed within the housing and which includes at least a second slot; a shaft which is coupled to the first and said second wheel; a shaft movement control assembly which is coupled to the shaft and which causes the shaft to selectively move by a certain amount, thereby concomitantly moving each of the first and the second wheels by the certain amount, effective to allow only one of the at least one slot and the at least second slot to communicate with the door opening; and a processor assembly which allows the door to be moved to the open position when the one of the at least one slot and the at least second slot are communicating with the door opening, thereby allowing one of the actions of placing a key within and removing a key from the single slot which is communicating with the door opening to be accomplished.

According to a third non-limiting aspect of the present invention, a method for storing and dispensing keys is provided. Particularly, the method includes the steps of forming a plurality of slots; allowing each of the plurality of slots to selectively and respectively receive only a single unique key; identifying each of the unique keys; determining which one of the unique keys is to be dispensed; determining which of the plurality of slots contains the one of the unique keys which is to be dispensed; allowing only the determined one of the plurality of slots to be accessed while concomitantly preventing access to all other of the plurality of slots, thereby allowing only the one of said unique keys to be dispensed while causing the remaining keys to continue to be stored.

These and other features, aspects, and advantages of the present invention will become apparent from a reading of the following detailed description of the preferred embodiment of the invention, including the subjoined claims, and by reference to the following drawings.

DETAILED DESCRIPTION OF THE PREFERRED EMBODIMENT OF THE INVENTION

Figure 1:
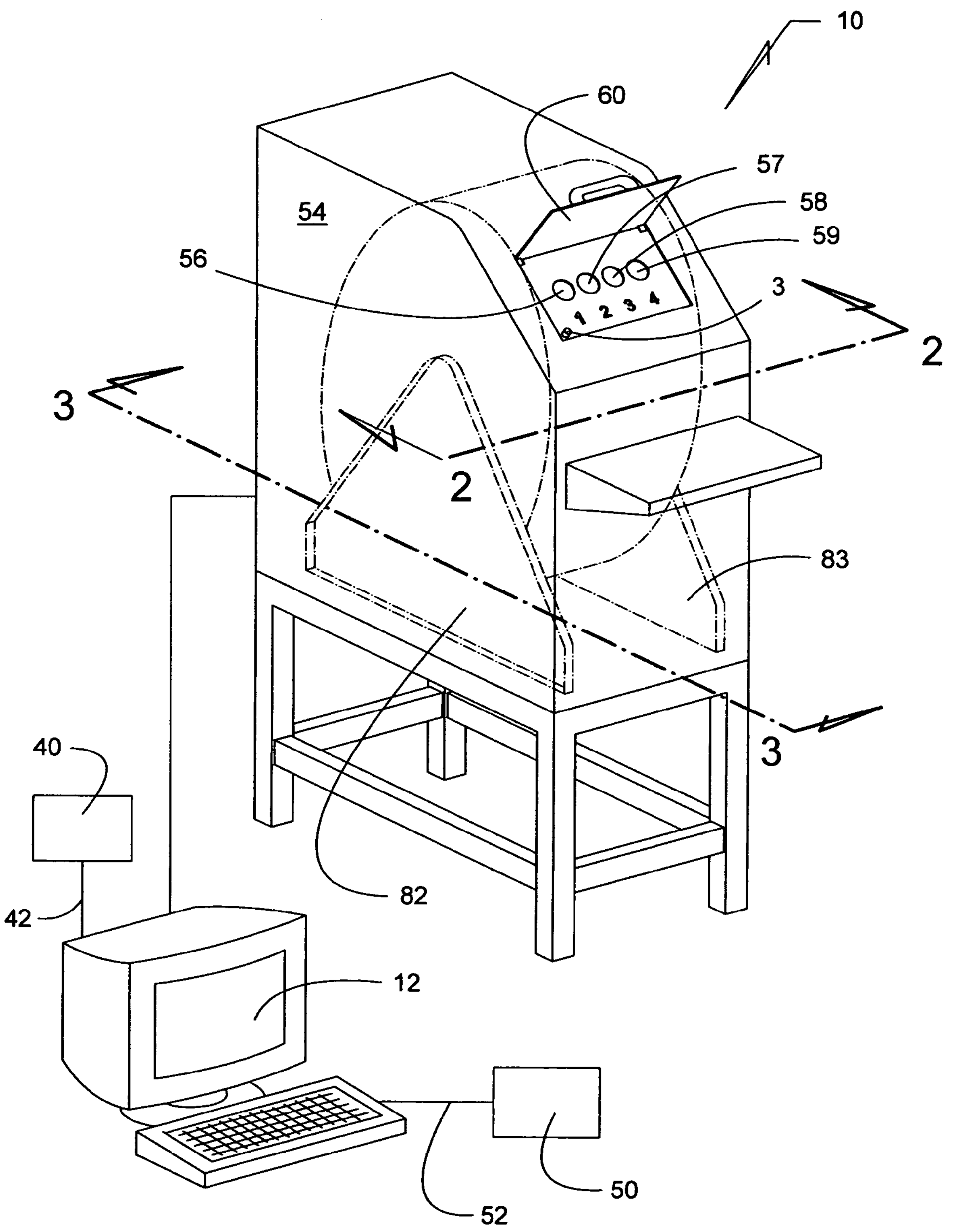
FIG. 1 is a front perspective view of a key storage and dispensation assembly which is made in accordance with the teachings of the preferred embodiment of the invention.
Figure 8:
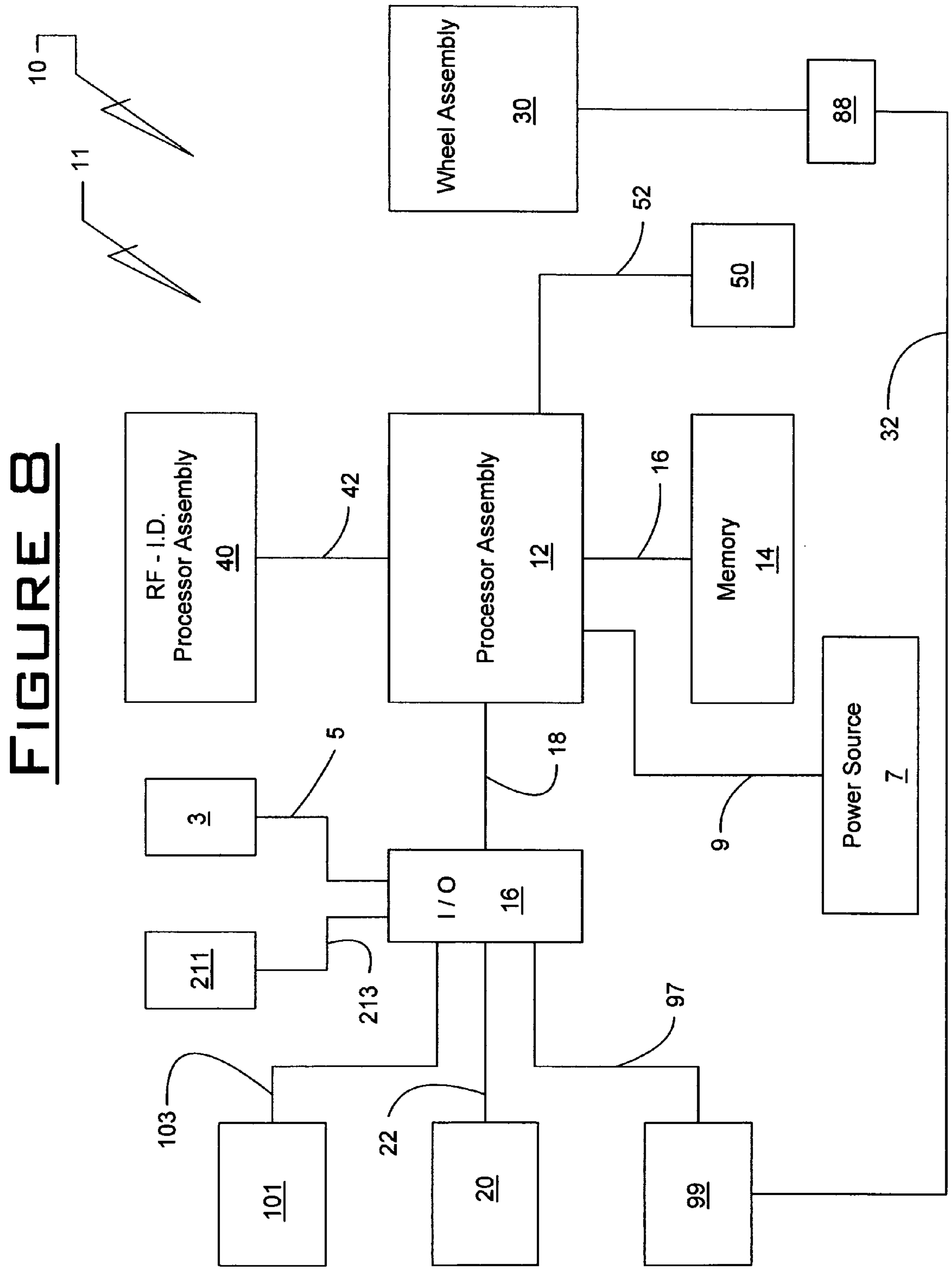
FIG. 8 is a block diagram which the assembly which is shown in FIG. 1.

Referring now to FIGS. 1 and 8, there is shown a key storage and dispensation assembly 10 which is made in accordance with the teachings of the preferred embodiment of the invention.

Particularly, the system 10 includes a processor assembly 11 which is operable under stored program control and which may comprise a commercially available processor or computer assembly such as but not limited to that which is provided by the Dell® corporation and which utilizes a Pentium® type or dual core type processor which is provided by the Intel® corporation. Other types of processor assemblies (e.g., lap top type computers) may be used, of course. The assembly 10 further includes a memory portion 14 which is coupled to the processor 12 by use of the bus 16 and the memory portion 14 contains the software and/or firmware necessary to define the operation of the assembly 10. The memory portion 14 also includes data which is acquired and utilized by the system 10 during operation.

The system 10 further includes an input/output portion 16 which is coupled to the processor 12 by use of the bus 18 and which allows the processor 12 to communicate with those devices/individuals resident upon a global communications network as well as local display devices (e.g., monitors), such as monitor 20 which may be selectively connected to the input/output portion 16 by use of the bus 22. A motor controller 99 is also included within the assembly 10 and will be discussed later. This motor controller 99 is controllably coupled to the processor 12 by the use of bus 97 which connects the motor controller 99 to the input/output portion 16. The assembly 10 also includes or is adapted to be connected to a source of electrical power 7 which is coupled to the processor 12 by the use of the bus 9 and which provides operating power to the processor 12 and allows the processor 12 to selectively provide this operating power to other components of the system 10.

The assembly 10 further includes a wheel assembly 30 which is coupled to a motor assembly 88 and the motor assembly 88 is coupled to the motor controller 99 by the bus 32. As will be explained in greater detail below, the wheel assembly 30 stores and selectively dispenses keys under the direction and control of the processor 12. Further, the assembly 10 also includes a radio frequency identification assembly 40 which is coupled to the processor 12 by use of the bus 42 and which allows keys to be tracked as well as determining the identity of those individuals who are utilizing the system 10. In another embodiment, the system 10 further includes a biometric reading device 50 which is coupled to the processor 12 by use of the bus 52. As should be appreciated, the biometric reading device 50 determines the identity of those individuals who are utilizing the system 10 or who are attempting to utilize the system 10 and notifies the processor 12 of these respective identities. Non-limiting examples of such biometric reading devices which may be utilized by this assembly 10 include a fingerprint reader, an iris or eye scanner, and/or a voice recognition device.

As is perhaps best shown in FIG. 1, the assembly 10 further includes a housing 54 having an a plurality of openings 56, 57, 58, and 59 and a door 60 which is selectively movable from a first position (shown in FIG. 1) which is remote or removed from the openings 56, 57, 58, and 59 to a second closed position in which the door 60 overlays the openings 56, 57, 58, and 59, thereby preventing access to these openings 56, 57, 58, and 59 from the ambient environment 2. It should be appreciated that the housing 54 may be of any desired shape and may be constructed from steel, aluminum, plastic, or some other desired material.

Figure 2:
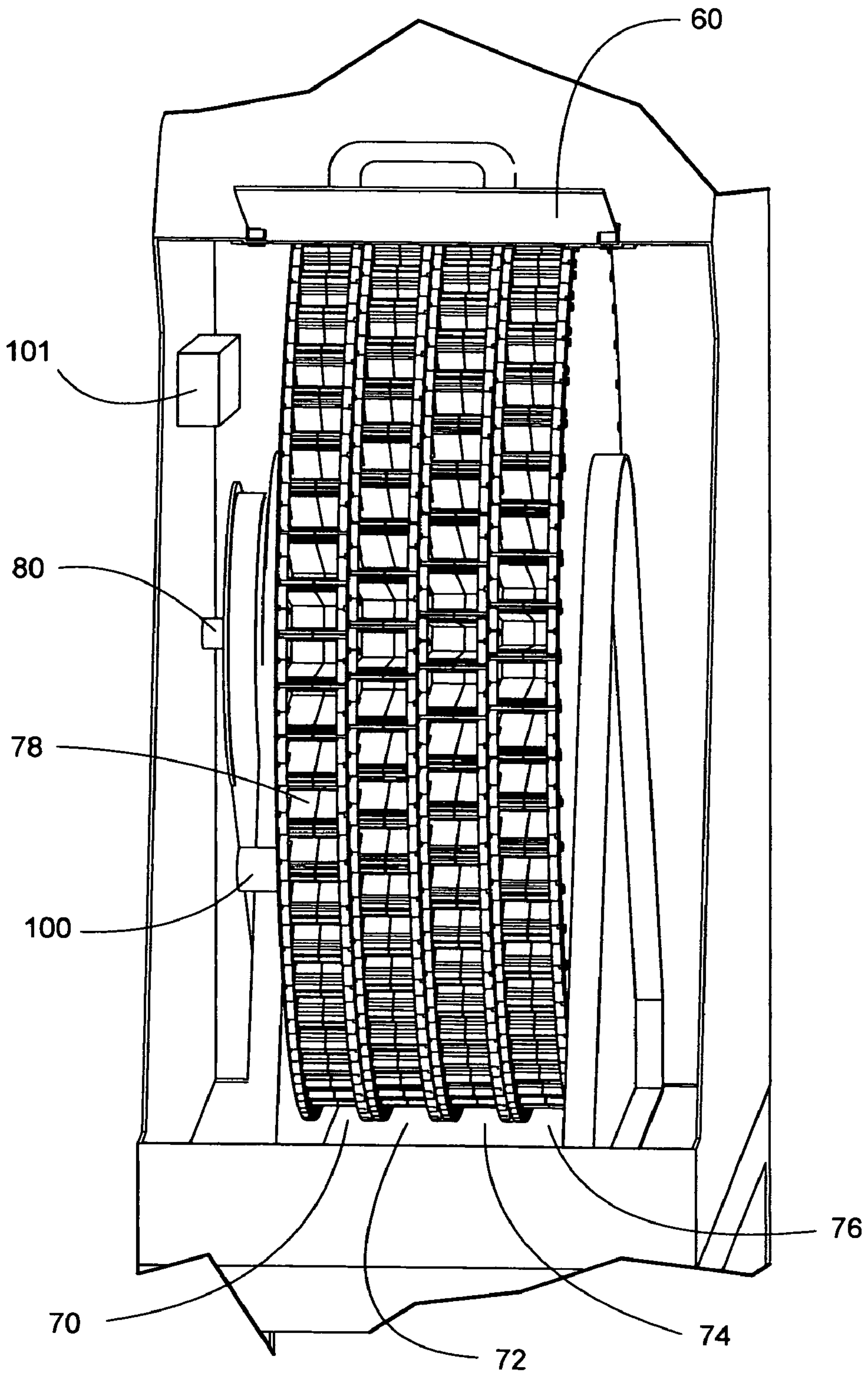
FIG. 2 is a sectional view of the assembly which is shown in FIG. 1 and which is taken along view line 2-2.
Figure 3:
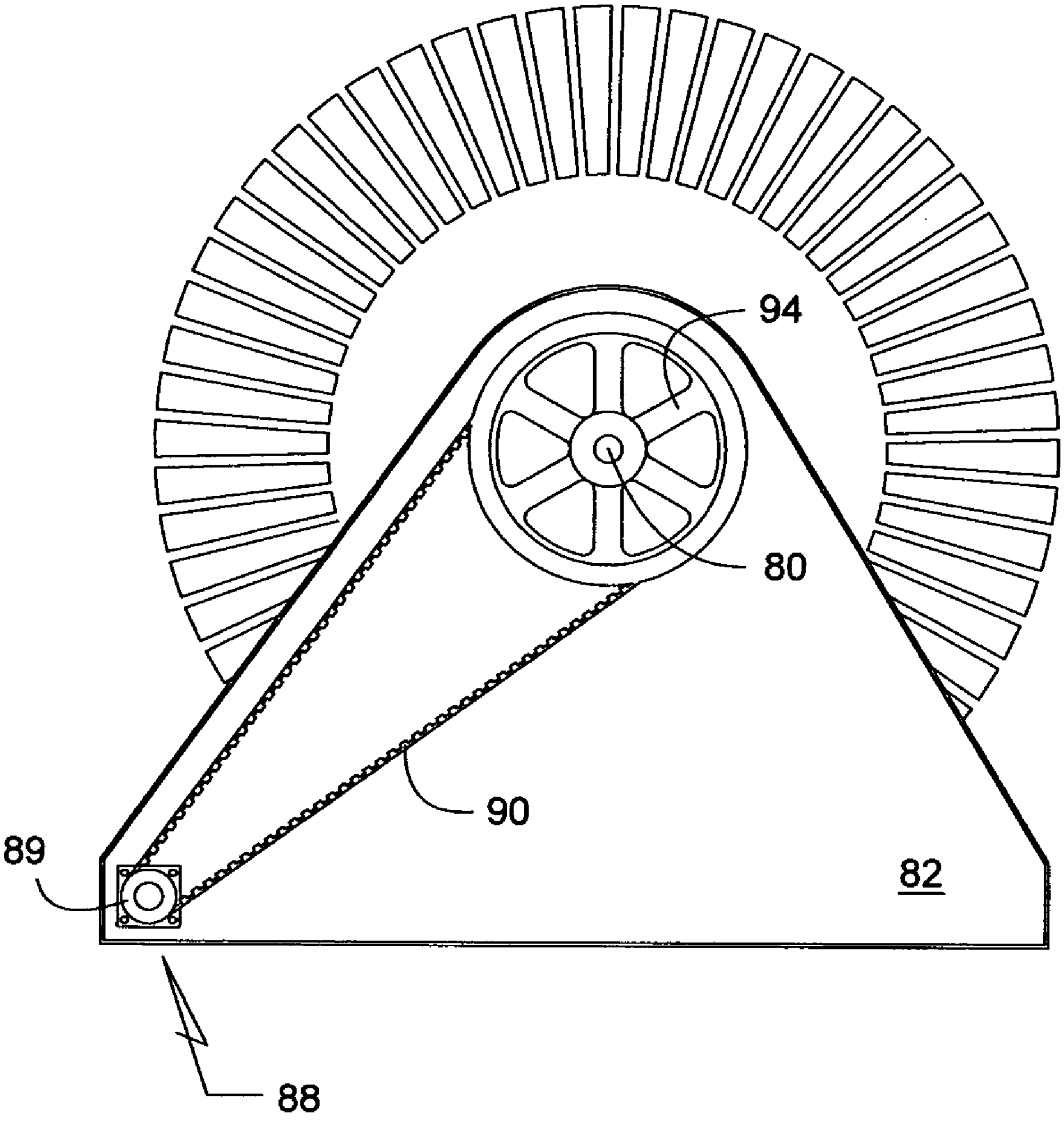
FIG. 3 is a sectional view of the assembly which is shown in FIG. 1 and which is taken along view line 3-3.
Figure 4:
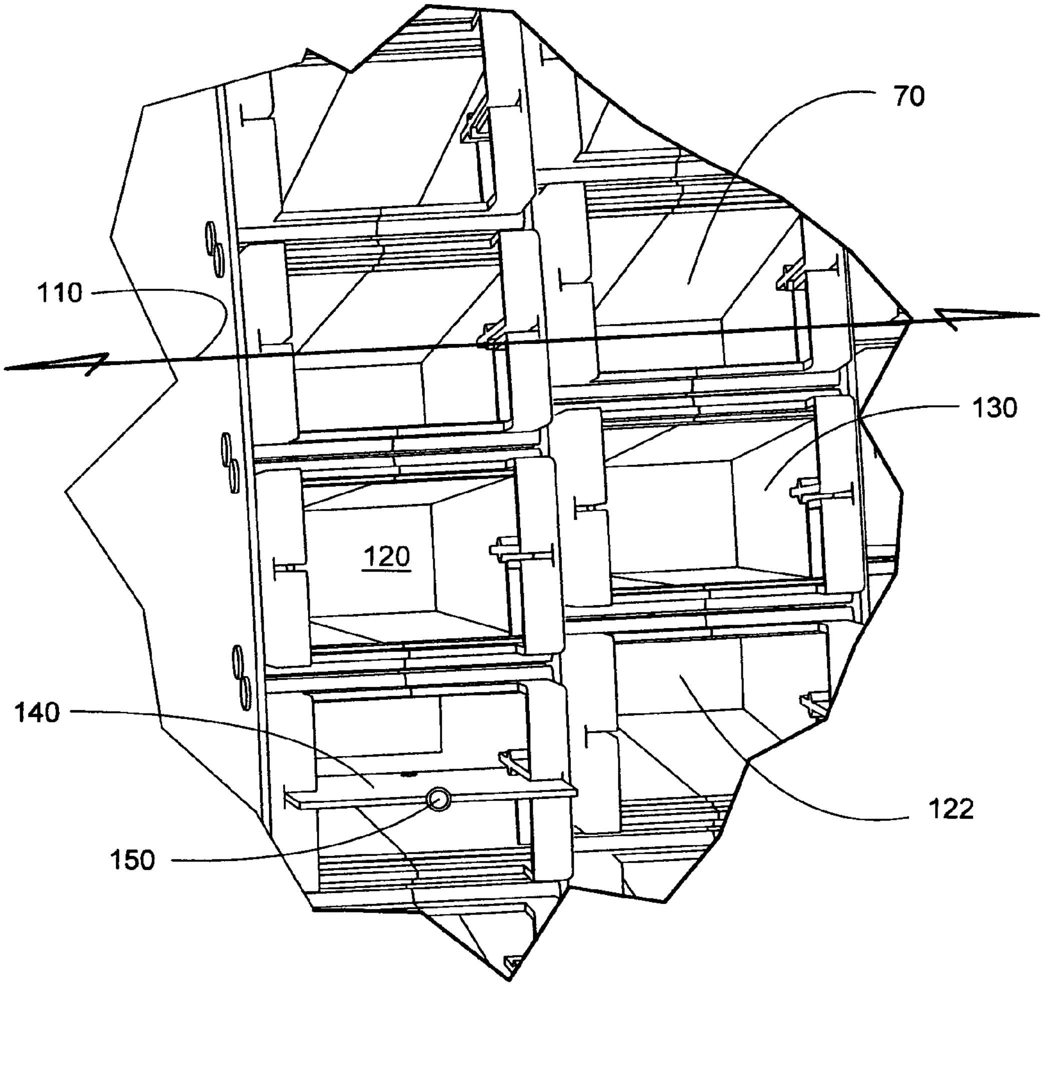
FIG. 4 is a partial exploded view of the wheels which are shown in FIG. 2.

Referring now to FIGS. 2, 3, and 4, the wheel assembly 30 includes, in one non-limiting embodiment, four substantially identical wheels 70, 72, 74, and 76 which each include substantially identical slots, such as slot 78 and the provided wheels 70, 72, 74, and 76 are physically coupled together by a conventional fastener methodology (e.g., by the use of bolts or any type of fastener) and which reside upon a drive shaft 80 which is movably secured to two opposed inner walls 82, 83 within the housing 54. The assembly 10 further includes a motor assembly 88 which is coupled to the inner wall 82 and which includes a selectively movable rotor 89. The rotor 89 is coupled to a timing chain or belt 90 and the belt 90 is received upon a gear 94 which frictionally receives the shaft 80. It should be realized that each wheel 70, 72, 74, and 76 is uniquely associated with a single respective one of the openings 56, 57, 58, and 59 in a manner which will be delineated in more detail below (e.g., each wheel 70, 72, 74, 76 has it respective slots adapted to be selectively communicating with a unique one of the openings 56, 57, 58, 59). Because they are coupled, the wheels 70, 72, 74, and 76 move together on the shaft 80.

The system 10 further includes a magnet 100 which resides upon the wheel 70 and a magnetic sensitized switch 101 (e.g., a magnetic reed switch) which resides within the housing 54 and in close proximity to the magnet 100 and which is coupled to the input/output portion 16 by use of the bus 103, thereby allowing the switch 101 to sense the presence of the magnet 100 at a predetermined orientation or location of the wheel 78 and to communicate this fact to the processor assembly 12. That is, the switch 101 is adapted to communicate a signal to the processor assembly 12, through the input/output portion 16, when the magnet 100 is at its closest position relative to the switch 101 (e.g., when the sensed magnetic field is sensed to be the strongest or above a certain threshold value). At this position, the magnetic field emanating from the magnet 100 causes the reed switch to become "closed" or activated, thereby causing the switch to generate a signal. Other types of switches may be utilized.

Thus, the processor assembly 12 is adapted to selectively move the coupled wheels 70, 72, 74, and 76 by sourcing electrical power to the controller 99 the rotor 89 of the motor assembly 88 begins. The sourced electrical power motor assembly 88 by use of the bus 32. Once obtaining electrical power, the to rotate which, in turn, causes the chain or belt 90 to move gear 94, thereby imparting rotational energy onto the drive shaft 80 in a manner which causes the coupled wheels 70, 72, 74, and 76 to move by the same amount. When electrical power is removed or interrupted from being communicated to the controller 99, then the rotor 89 ceases movement and the wheels 70, 72, 74, and 76 cease movement. Thus, the wheels 70, 72, 74, and 76 are able to controllably and selectively rotate within the housing 54 by a controlled amount (i.e., the longer that electrical power is sourced to the motor controller 99, the greater is the distance that the wheels 70-76 travel and the amount of wheel travel for each time duration of electrical power sourcing may be easily calibrated and stored within memory 14).

Importantly, each of the slots, such as slot 78, of each of the wheels 70, 72, 74, and 76 are substantially identical and as the wheel 70 rotates each of its contained slots, such as slot 78, sequentially passes the opening 56. Similarly, each of the contained slots of the wheel 72 sequentially passes opening 57 as the wheel 72 rotates within the housing 54. Similarly, each of the contained slots of the wheel 74 sequentially passes opening 58 as the wheel 74 rotates within the housing 54 and each of the contained slots of the wheel 76 sequentially passes by the opening 59. Since the wheels 70-76 are coupled, they move together. In the most preferred embodiment of the invention and in order to prevent slots from each of the wheels 70-76 to be simultaneously accessible through the openings 56, 57, 58, and 59, the slots of the wheels 70-76 are staggered. That is, each slot, such as slot 78 has a longitudinal axis of symmetry 110. In this "most preferred" staggered configuration, none of the individual and respective axes of symmetry 110 of the slots are aligned. Thus, when a slot is behind an opening, such as opening 56-59, it is the only slot that is capable of being accessed (e.g., none of the other slots are communicatively coupled to anyone of the openings 56-59).

Figure 5:
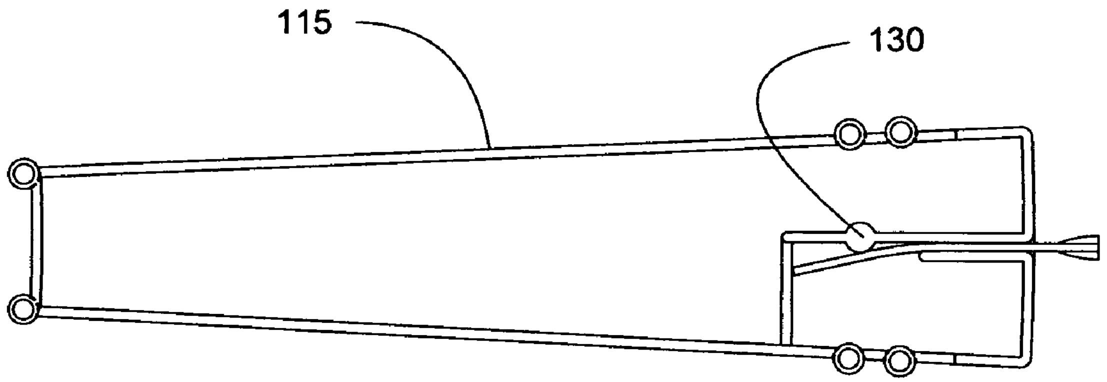
FIG. 5 is a partial exploded view of one of the slots which is shown in FIG. 4.
Figure 6:
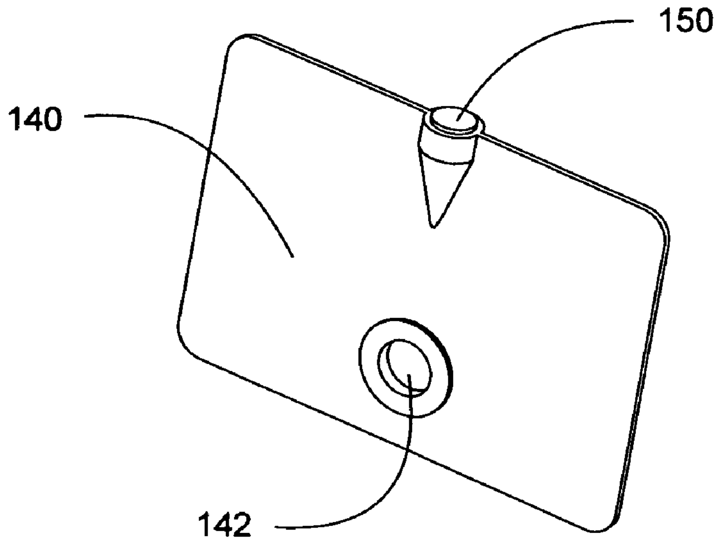
FIG. 6 is a top view of a key receptor which is made in accordance with the teachings of the preferred embodiment of the invention.
Figure 7:
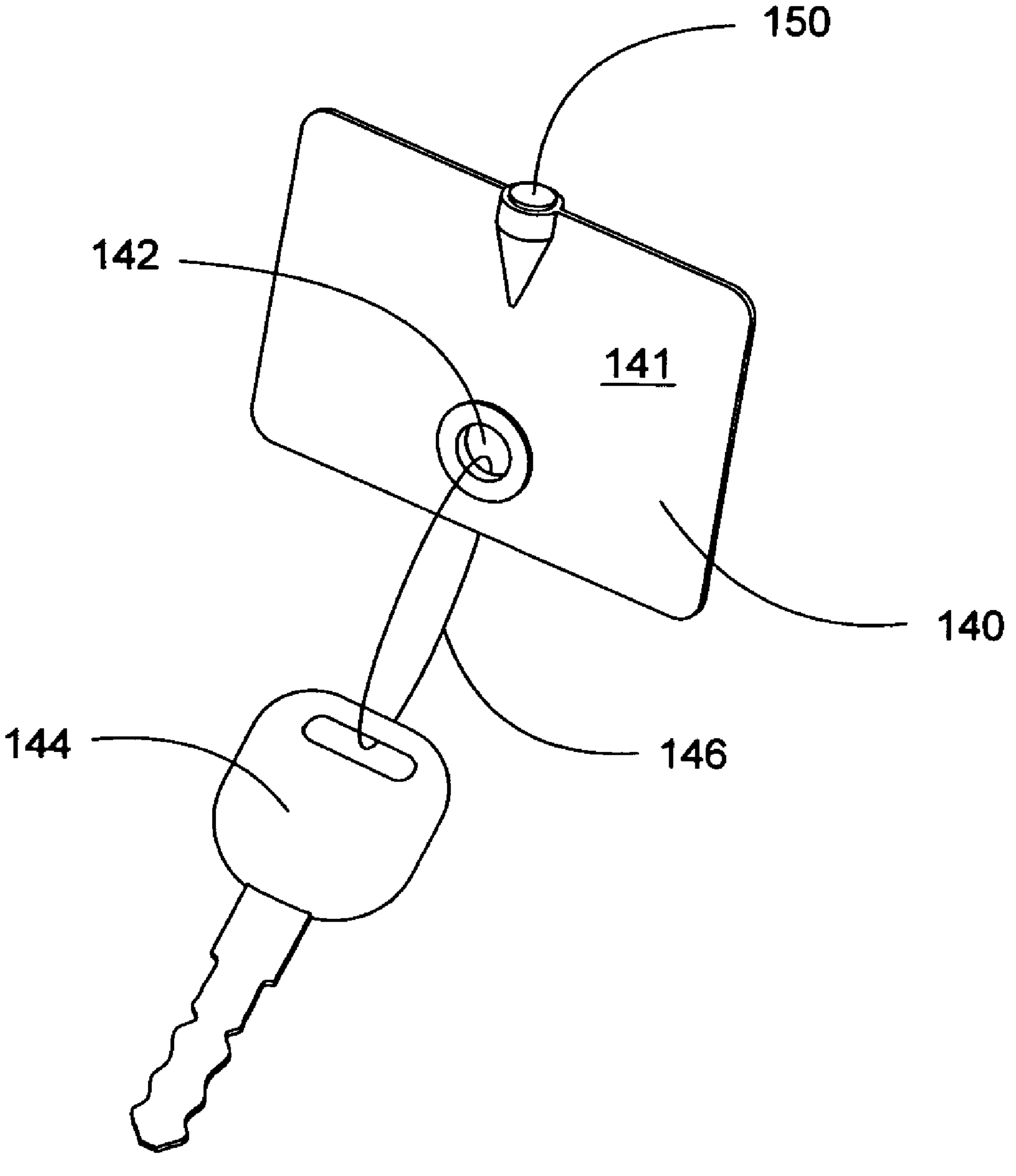
FIG. 7 is a top view of the key receptor which is shown in FIG. 6 in combination with a key.

Referring now to FIGS. 4 and 5, each slot, such as slot 78 is generally rectangular in shape and is generally hollow and includes an open mouth portion 120 and a closed back portion 122. Each slot, such as slot 78, include two substantially identical and linearly coextensive side portions 115 which taper in a direction moving from the mouth portion 120 to the closed back portion 122 and which include a substantially similar detent 130.

The assembly 10 also includes a plurality of substantially planar and relatively thin cards 140 having an opening 142.

Each opening 142 is adapted to receive a unique key chain 146 and each unique key chain 146 is respectively attached to a unique key 144 which is to be selectively stored within and dispensed from the assembly 10. Each card 140 includes a radio frequency information portion 150 which communicates with the radio frequency processor assembly 40 and which may receive information from the radio frequency processor assembly 40. In this manner, the radio frequency processor assembly 40 may selectively write information to the radio frequency information portion 150 of each card 140 as well as read information from each portion 150. As is perhaps best shown in FIG. 4, a card 140 is inserted into a slot, such as slot 78, by having the planar body 141 engage and be depressed by the detent 130. In this manner, the card 140 may be selectively inserted into and selectively removed from a slot, such as slot 78, and the frictional engagement of the body 140 with the detent 130 causes the care 140 to frictionally remain within the slot, such as slot 78. In one non-limiting embodiment of the invention, the cards 140 and the assembly 40 are obtained from The Maxwell Corporation of America (www.maxwell.com).

Figure 10A:
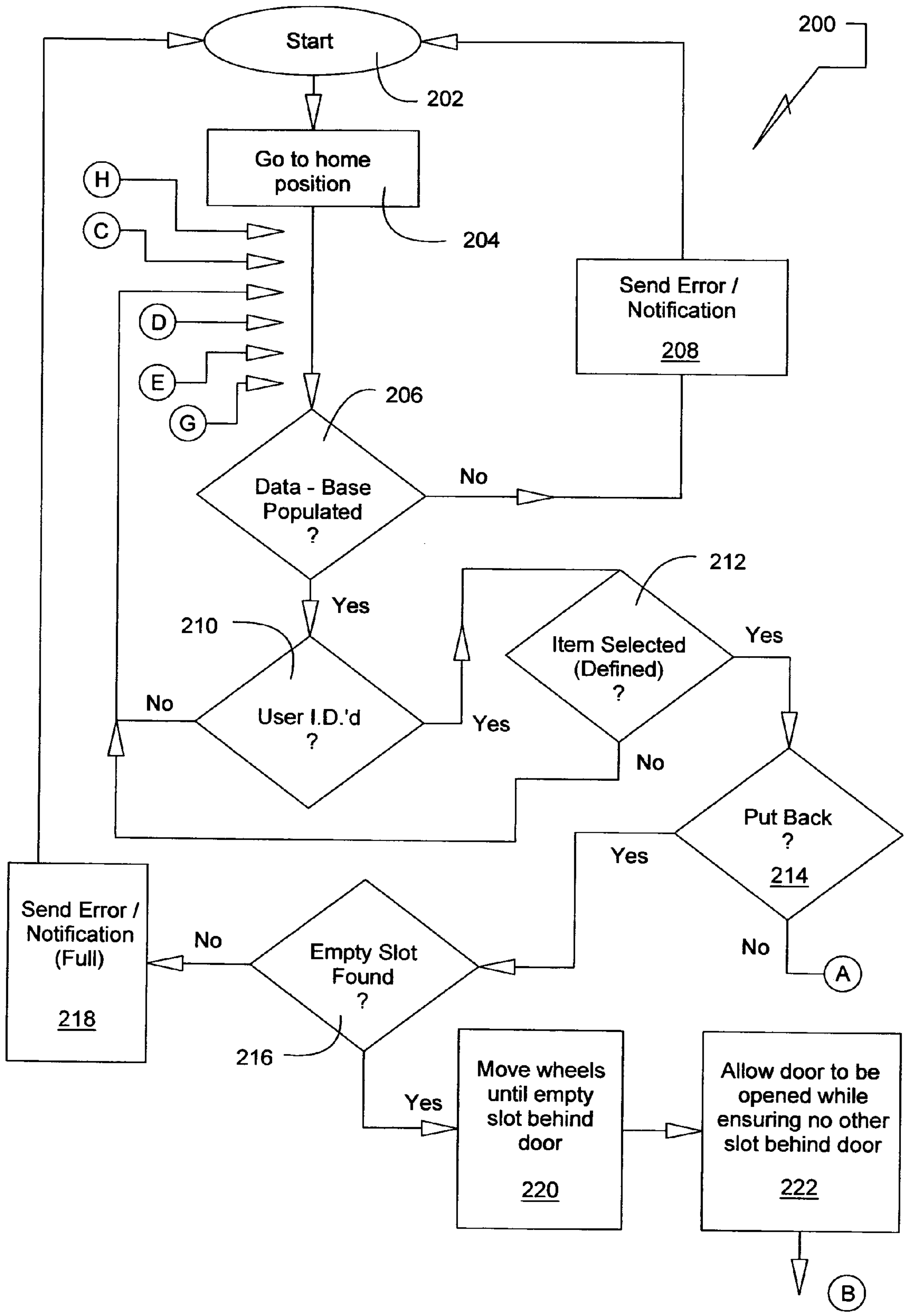
FIGS. 10(*a-c*) are flowcharts which cooperatively form the sequence of steps associated with the methodology of the preferred embodiment of the invention.
Figure 10B:
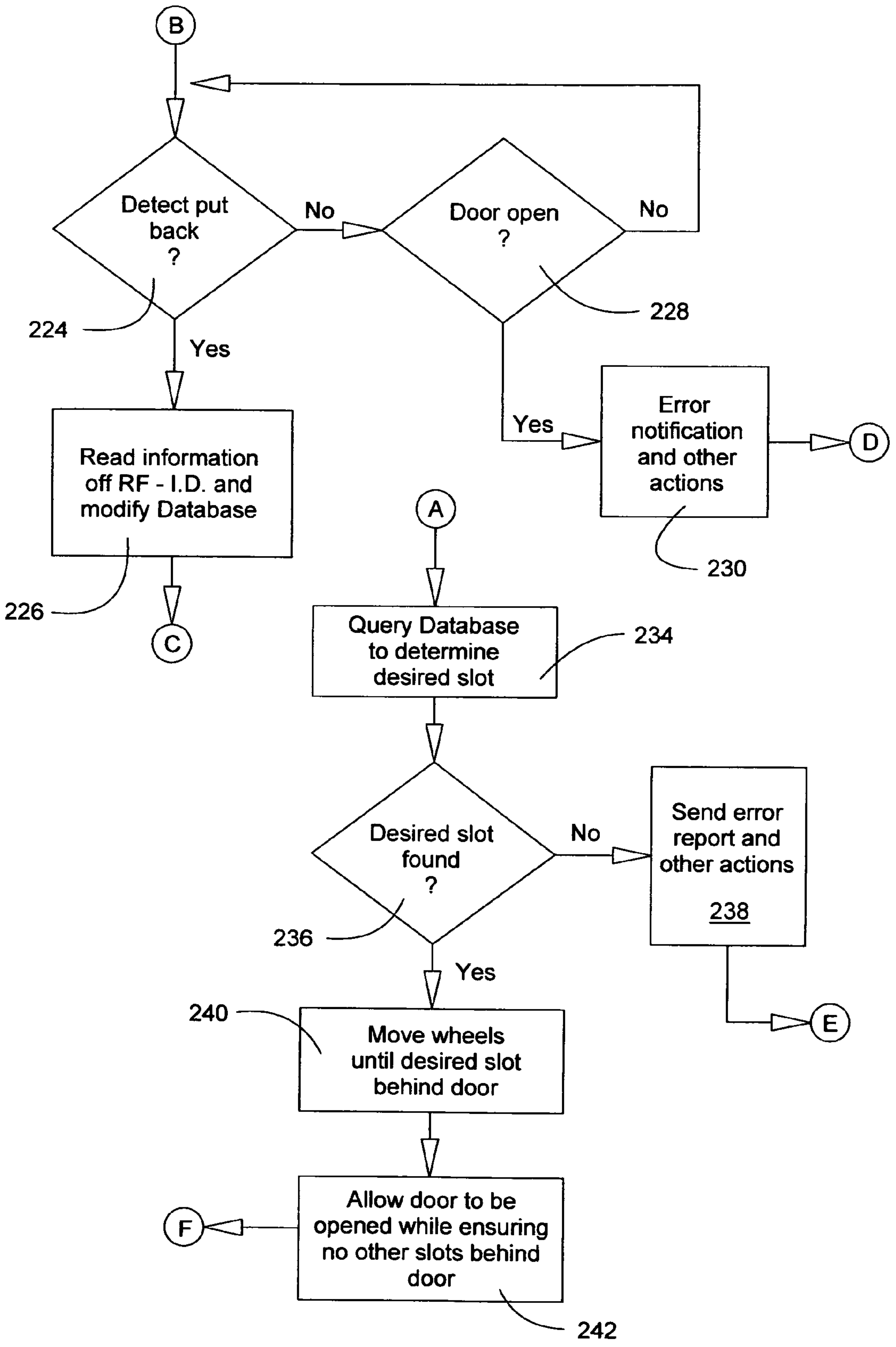
Figure 10C:
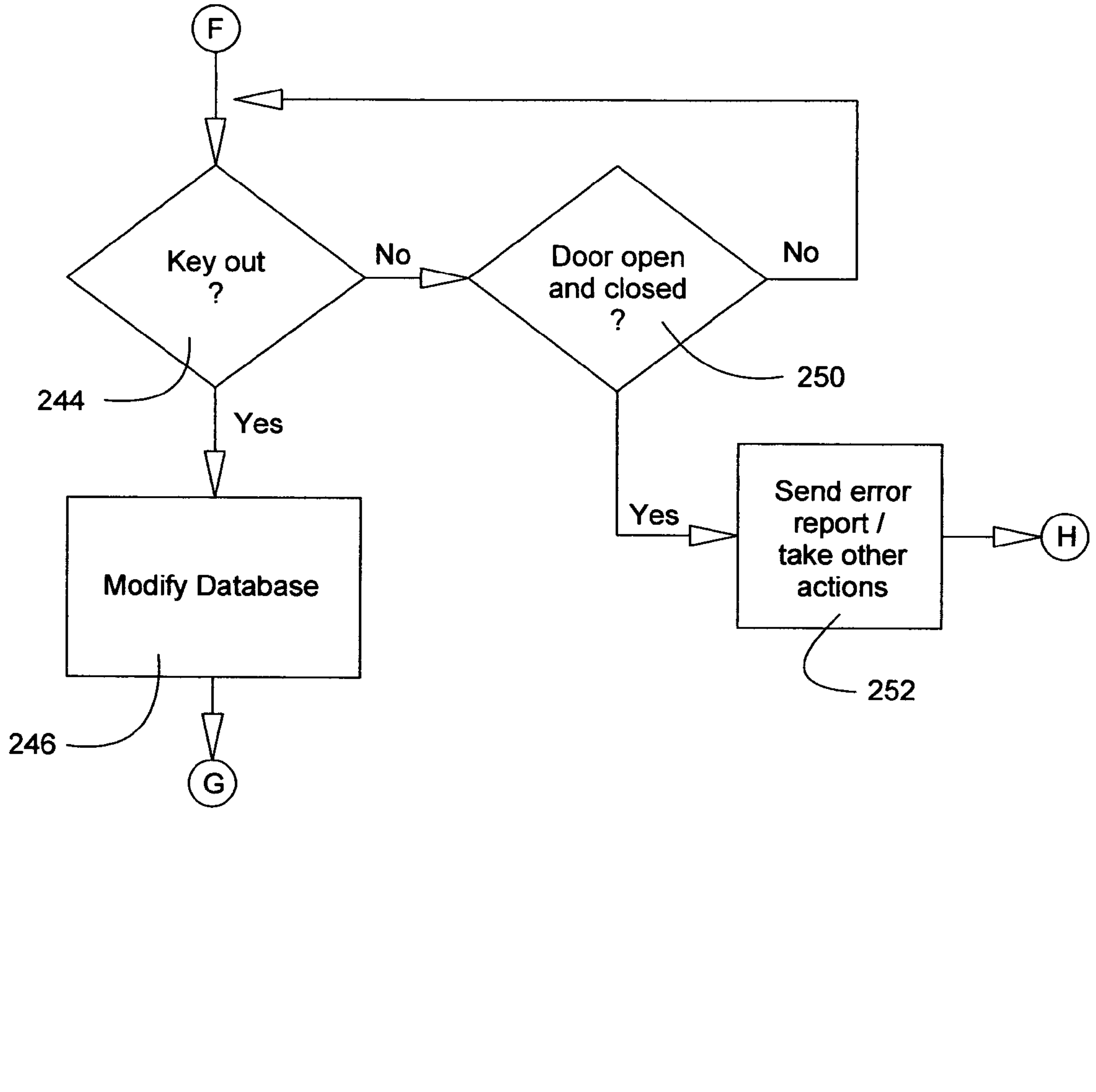

Referring now to FIGS. 10(*a-c*), the operation of the assembly 10 will now be discussed. Particularly, as shown in flowchart or methodology 200 includes a first step 202 which denotes the beginning of the methodology (e.g., the supply of electrical power from the power source 7 to the processor assembly 12). The step 202 is followed by step 204 in which the processor causes the wheels 70,72,74, and 76 to rotate until the switch 101 sends a signal to the processor assembly 12, thereby denoting that a "home" position has been achieved (e.g., the "home" position means the position where the switch 101 senses the strongest signal from the magnet 100). Step 204 is followed by step 206 in which processor assembly 12 determines whether the database is populated and is resident within the memory portion 14. This database includes information about the keys which may be stored within the wheel assembly 30 (e.g., within the various slots 78).

Figure 9:
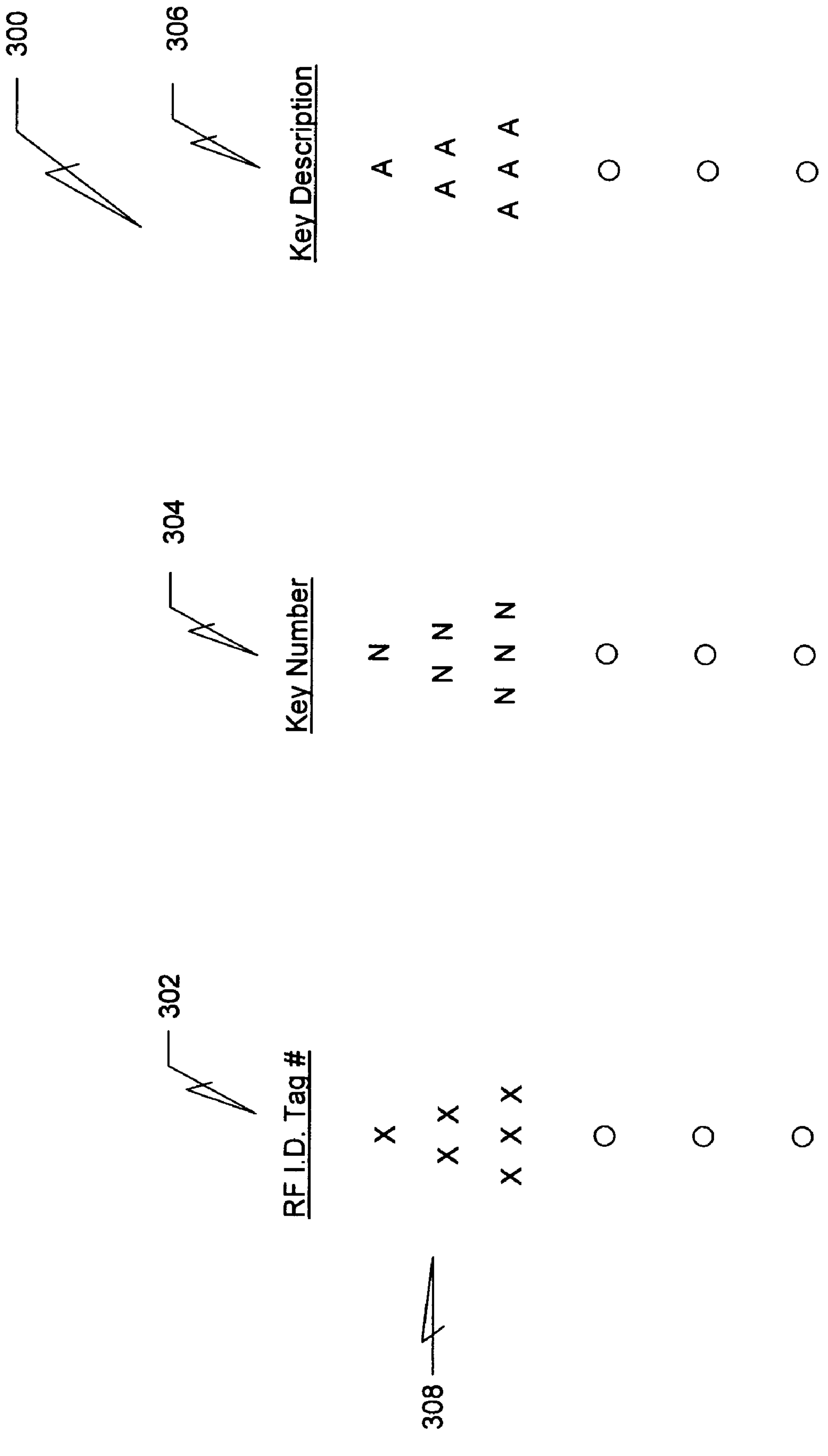
FIG. 9 is a diagrammatic view of a database which is utilized by the assembly which is made in accordance with the teachings of the preferred embodiment of the invention and which is shown in these FIGS. 1-8.

For example, referring now to FIG. 9, database 300, which is one non-limiting example of a database which may be used by the assembly 10, includes columns of information 302, 304, 306 which respectively contain the identify of the unique radio frequency tag numbers for each key used in the system 10, the identity of the unique number respectively assigned to each of the keys used in the system 10, and information related to the description of each of the keys. Each line of information, such as line 308, includes the radio frequency identification information, the key number, and the description of one unique key. Other types of data may be alternatively used within the database 300 and nothing in this description is meant to limit the database to a particular type or format of data or information.

If, in step 206, it is determined that the database contains no entries (e.g, is not populated), then step 206 is followed by step 208 in which the processor assembly generates some sort of error or other notification report, such as that which may be displayed upon display 20. Step 208 is followed by step 202.

Alternatively, step 206 is followed by step 210 in which a user must be correctly identified. Such identification may be effectuated by use of the biometric reading device 99, by the use of a separate radio frequency information tag or card which is read by the assembly 40, or by substantially any other desired methodology. If the proposed user has been correctly identified as, in fact, an "authorized" user, then step 210 is followed by step 212. If no such correct identification has occurred, then step 210 is followed by step 206.

In step 212, it is determined whether the correctly identified user desires to "put back" a key into the wheel assembly 30. Such determination is made based upon, in one non-limiting example, by use of a touch screen command given to the processor assembly 12 by use of the display 20. Other types of user generated commands may be used. If it is determined that a "put back" is required, then step 214 is followed by step 216 in which it is determined whether an empty slot (e.g., a slot without a card 140) exists within the wheel assembly 30. Such a determination is made by having the processor assembly 12 query the radio frequency identification portion 150 of each of the cards 140 and each portion 150 includes information concerning the identity of the slot what it respectively resides within (e.g. as described later, the identity of the slot to which a card 140 is placed is written onto the portion 150 of the card 140 by the assembly 40 when it is put into the slot). If the queried information indicates to the processor assembly 12 that all of the slots are full, then step 216 is followed by step 218 in which the processor assembly 12 generates and transmits an error report or another indication, such as by the use of display 20. The step 218 is followed by step 202. Alternatively, step 216 is followed by step 220 in which the processor assembly 12 moves the coupled wheels 70,72,74,76 until the identified empty slot is behind one of the openings 56,57,58,59. The step 220 is followed by step 222 in which the processor assembly 12, by use of the display 20, indicates the opening 56,57,58,59 that the desired slot is behind and allows the door 60 to be open. In one non-limiting embodiment of the invention, the housing 54 includes a door locking mechanism 211 which is coupled, by bus 213, to the input/output portion. Normally, the processor assembly 12 energizes the mechanism 211, thereby preventing the door 60 to be moved to an outward position. Various types of door locking mechanisms may be utilized including a magnetic door locking mechanism (e.g., magnets are disposed on the door 60 and the housing 54 and, when energized, become attractive and cause the door 60 to remain closed). In this step 222, the processor assembly 12 deactivates the solenoid assembly 211, thereby allowing the door 60 to be opened. Any sort of conventional and commercially available and controllable door locking mechanism may be utilized and nothing is meant to limit the locking mechanism to this particular solenoid embodiment.

Step 222 is followed by step 224 in which the processor assembly 12, by use of the radio frequency reader assembly 40 attempts to read the portion 150 of the card 140 that just got put back into the empty slot. If the portion 150 was successfully read (e.g., indicating a successful "put back") then step 224 is followed by step 226 in which the database 300 is modified (e.g., the "description") entry is modified for this key to signify the slot that it now resides within. Alternatively and/or additionally, the identity of the slot that this key now resides within is placed within the portion 150 of the card that just got placed into this slot.

Alternatively, step 224 is followed by step 228 in which the processor assembly 12 determines whether the door 60 was opened since the locking mechanism 211 was deactivated. Such a determination may be made by the use of a pin switch 3 which is coupled to the input/output portion 16 by the use of bus 5. This pin switch 3 is operatively deployed within the housing 54 and is engaged by and depressed by the door 60 when the door 60 is placed in a closed position. When the door 60 is opened (as shown best in FIG. 1), the pin switch 3 is allowed to extend from the housing 54 and when extended, the pin switch 3 generates a signal to the input/output portion 16, by the use of bus 5, and this signal is communicated to the processor assembly 12 by use of the bus 18.

If, in step 228, the processor assembly 12 determined that the door 60 was opened and no "put back" occurred, then step 228 is followed by step 230 in which the processor assembly 12 generates an error report or takes some other action. Step 230 is followed by step 206. Alternatively, step 228 is followed by step 224.

If, in step 214, a "put back" was not requested, then step 214 is followed by step 234 and the system 10 recognizes the desired action as a "key pull out" and requests the key number requested. After obtaining the key number from the previously authorized user, the processor assembly 12 queries the database 300 to determine the slot that the desired key resides within. Alternatively, the processor assembly 12, by use of the assembly 40, could query the portion 150 of the tag 140 to which the target key is attached to and this information would include the slot that this key resides within.

Step 236 follows step 234 and, in this step 236, the processor assembly 12, if it has not already done so, uses the assembly 40 to make sure that the desired key is included within the wheel assembly 30 by ensuring that it can communicate with the portion 150 of the tag 140 to which the desired key is attached. If such communication is not possible, then step 236 is followed by step 238 in which the processor assembly 12 generates an error report (e.g., by use of the display 20) or takes some other action. Step 238 is followed by step 206.

Alternatively, step 236 is followed by step 240 in which the processor assembly 12 causes the connected wheels 70, 72, 74, and 76 to move within the housing 54 until the key containing slot lies just behind one of the openings 56,57,58,59. The processor assembly 12 then communicates the identify of the opening 56,57,58,59 that the desired key is behind to a user of the system 10 by use of display 20.

Step 240 is followed by step 242 in which the processor assembly 12 allows the door 60 to be opened (e.g., by deactivating the locking mechanism 211) and step 242 is followed by step 244 in which the processor assembly 12 determines whether the key has been taken. Such a determination may be made by attempting to communicate with the portion 150 of the tag 140 to which the key was and is attached and such communication should fail (if the key was removed from assembly 10). If the key is determined to have been take from the assembly 10 then the step 244 is followed by step 246 in which the database 300 is modified to reflect that the key was taken from the system 10. Step 246 is followed by step 206. Alternatively, step 244 is followed by step 250 in which processor assembly 12 determines whether the door 60 was opened and closed. If such a determination reveals that both of these activities occurred and the key remains within the assembly 10, then step 250 is followed by step 252 in which the processor assembly 12 generates an error report by the use of display 20 and/or takes some other action. Step 252 is followed by step 206. Alternatively, step 250 is followed by step 244.

Figure 11:
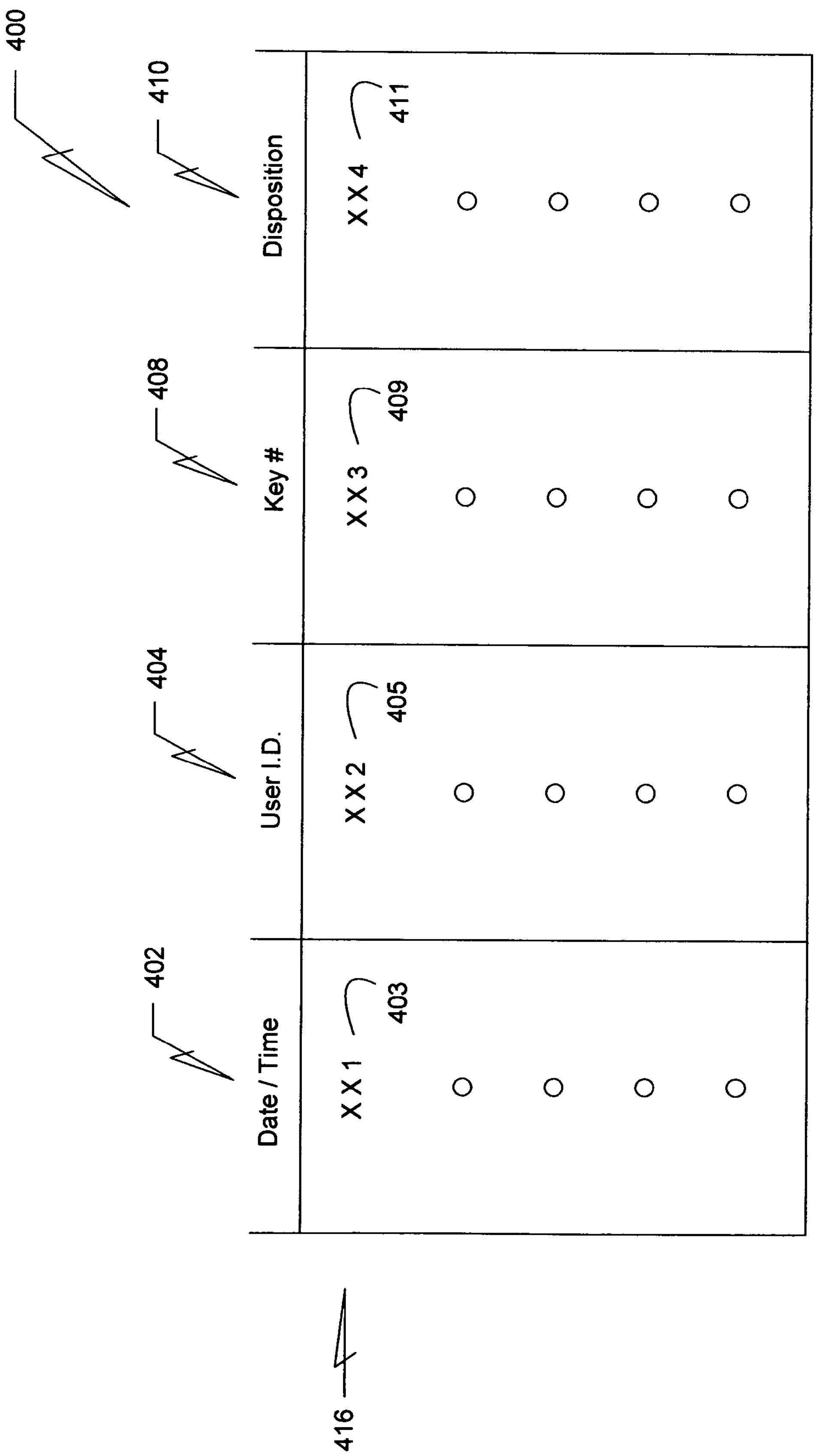
FIG. 11 is a diagrammatic view of an archival report which may be generated by the system made in accordance with the teachings of the preferred embodiment of the invention.

As one non-limiting example of reports which may be generated by the assembly 10 is shown by report 400 in FIG. 11. Particularly, the assembly 10 may keep track by date and time of the use of the assembly 10. For example, the report 400 includes a first column 402 labeled "date/time" and having a plurality of individual entries, such as entry 403, which are certain dates and times. Report 400 includes a second column 404 labeled "user id" having a plurality of individual entries 405 which each define a user identification number. Report 400 includes a third column 408 which is labeled "key number" and which includes a plurality of entries, such as entry 409, each of which define a certain key. Report 400 also includes a fourth column 410 which is labeled "disposition"

and which includes a plurality of entries, such as entry 411, each of which define a certain action, such as the taking of a key.

Each line of information in the report 400, such as line 416, defines certain actions which took place by a specified user upon a specified date to a certain key. In this manner, an administrator or certain individual can efficiently see what activities have occurred to the various keys of the system and the identity of those individuals who took such actions.

It is to be understood that the present invention is not limited to the exact embodiment which has been delineated above, but that various changes and modifications may be made without departing from the spirit and the scope of the invention as may be set forth in the following claims. It also should be realized that substantially any number of wheels may be used by the system 10 and that the system is not limited to any particular number of wheels. It should be realized that system/assembly 10 may also be adapted to store and dispense items other than keys.

What is claimed is:

1. A method for storing and dispensing keys comprising the steps of acquiring said keys; assigning a unique identification code to each key; providing a plurality of tags onto which information may be placed and remotely read; attaching a unique one of said plurality of tags to each of said respectively acquired keys; placing the respectfully unique identification code of each of said respective keys onto the respective tags attached to the respective keys; acquiring a wheel having a plurality of slots; creating a unique location code for each of said plurality of slots; placing each of said keys and said respective and attached tags into respectively and unique slots; placing the respectively unique location code of each respective slot into the respective tags which are respectively placed within the respective slots, whereby a tag contains the location code of said slot in which said tag resides; selecting one of said keys; remotely reading the location code and the identification code information of said tag attached to said selected one of said keys in order to determine the presence and the location of said selected one of said keys within said wheel; and moving said wheel to a predetermined position, effective to allow said selected one of said keys to be removed from the respective slot in which said selected one of said keys resides; and removing said selected one of said keys from said respective slot in which said selected one of said keys reside.

2. An assembly for storing and selectively dispensing keys, said assembly comprising a housing having an opening and a door which is selectively movable from a first closed position in which said door overlays said opening, to a second open position in which is door is remote from said opening; a first wheel which is movably disposed within said housing and which includes at least one first slot; a second wheel which in movably disposed within said housing and which includes at least one second slot; a shaft which is coupled to said first and said second wheel; a shaft movement control assembly which is coupled to said shaft and which causes said shaft to selectively move by a certain amount, thereby concomitantly moving each of said first and said second wheels by said certain amount, effective to allow only a selected one of said at least one first slot and said at least one second slot to communicate with said door opening; a processor assembly which selectively activities said shaft movement assembly and allows said door to be moved to said open position wherein said selected one slot is communicating with said door opening, thereby allowing one of the actions of placing a key within and removing a key only from the one selected slot which is communication with said door opening to be accomplished; and a plurality of radio frequency tags which are respectively coupled to each of the respectively unique keys and which respectively contain the identity of respectively unique slots in which each of the respectively unique keys resides and wherein said tags each being in remote communicating with said processor and which cooperatively communicate the location of each of said keys to said processor effective to allow said processor to determine and effectuate the amount of movement needed by said first and said second wheels necessary to cause said one selected slot to reside behind said door.

* * * * *